(12) United States Patent
Liu et al.

(10) Patent No.: US 7,058,237 B2
(45) Date of Patent: Jun. 6, 2006

(54) REAL-TIME WIDE-ANGLE IMAGE CORRECTION SYSTEM AND METHOD FOR COMPUTER IMAGE VIEWING

(75) Inventors: Zicheng Liu, Bellevue, WA (US); Michael Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 809 days.

(21) Appl. No.: 10/186,915

(22) Filed: Jun. 28, 2002

(65) Prior Publication Data

US 2004/0001146 A1 Jan. 1, 2004

(51) Int. Cl.
*G06K 9/36* (2006.01)
*G09G 5/00* (2006.01)
*H04N 5/225* (2006.01)

(52) U.S. Cl. .................. 382/276; 382/275; 345/660; 348/207.99

(58) Field of Classification Search ................ 382/254, 382/275, 276, 284, 289, 298, 312, 316, 293, 382/296; 345/629, 647, 648, 660, 683; 348/36, 348/578, 207.99
See application file for complete search history.

(56) References Cited

U.S. PATENT DOCUMENTS

| | | | |
|---|---|---|---|
| 5,396,583 A * | 3/1995 | Chen et al. .................. 345/427 |
| 5,686,957 A * | 11/1997 | Baker ............................ 348/36 |
| 5,796,426 A * | 8/1998 | Gullichsen et al. .... 348/207.99 |
| 5,990,941 A * | 11/1999 | Jackson et al. ........ 348/207.99 |
| 5,999,660 A | 12/1999 | Zorin et al. |
| 6,069,668 A * | 5/2000 | Woodham et al. .......... 348/578 |
| 6,377,712 B1 * | 4/2002 | Georgiev et al. ........... 382/293 |
| 6,750,903 B1 * | 6/2004 | Miyatake et al. ......... 348/218.1 |
| 6,778,207 B1 * | 8/2004 | Lee et al. ..................... 348/36 |
| 6,870,532 B1 * | 3/2005 | Travers et al. .............. 345/419 |
| 2002/0063802 A1 | 5/2002 | Gullichsen et al. |

OTHER PUBLICATIONS

Yamamoto, T. and Doi, M., "PanoVi: Panoramic movie system for real-time network transmission" in *IEEE 4th Workshop on Multimedial Signal Processing: Oct. 3-5, 2001, Cannes, France*, pp. 389-394, 2001.

Irani, M., Anandan, P., and Hsu, S., "Mosaic based representational of video sequence and their applications" in *International Conference on Computer Vision (ICCV'95)*, pp. 605-611, 1995.

Mann, S. and Picard, R.W., "Virtual bellows: Constructing high quality images from video", in *First IEEE International Conference on Image Processing (ICIP'94)*, pp. 1:363-367, 1994.

(Continued)

*Primary Examiner*—Kanjibhai Patel
(74) *Attorney, Agent, or Firm*—Lyon & Harr, L.L.P.; Craig S. Fischer

(57) ABSTRACT

The present invention includes a real-time wide-angle image correction system and a method for alleviating distortion and perception problems in images captured by wide-angle cameras. In general, the real-time wide-angle image correction method generates warp table from pixel coordinates of a wide-angle image and applies the warp table to the wide-angle image to create a corrected wide-angle image. The corrections are performed using a parametric class of warping functions that include Spatially Varying Uniform (SVU) scaling functions. The SVU scaling functions and scaling factors are used to perform vertical scaling and horizontal scaling on the wide-angle image pixel coordinates. A horizontal distortion correction is performed using the SVU scaling functions at and at least two different scaling factors. This processing generates a warp table that can be applied to the wide-angle image to yield the corrected wide-angle image.

36 Claims, 16 Drawing Sheets

OTHER PUBLICATIONS

Szeliski, R. and Shum, H-K, "Creating full view panoramic image mosaics and environment maps" in *Computer Graphics, Annual Conference Series*, pp. 251-258, Siggraph, 1997.

Zhang, Z., "Flexible camera calibration by viewing a plane from unknown orientations", in *International Conference on Computer Vision (ICCV'99)*, pp. 666-673, 1999.

Zorin, D. and Barr, A., "Correction of geometric perceptual distortions in pictures", in *Computer Graphics, Annual Conference Series*, pp. 257-264, Siggraph, Aug. 1995.

Co-pending U.S. Appl. No. 10/262,292, "Foveated Wide-Angle Imaging System and Method for Capturing and Viewing Wide-Angle Images in Real Time", filed Sep. 30, 2002.

* cited by examiner

BEFORE PROCESSING WITH SVU SCALING FUNCTION

AFTER PROCESSING WITH SVU SCALING FUNCTION

REGULAR
FIELD-OF-VIEW

WIDE-ANGLE
FIELD-OF-VIEW

REAL-TIME WIDE-ANGLE IMAGE CORRECTION SYSTEM AND METHOD FOR COMPUTER IMAGE VIEWING

TECHNICAL FIELD

The present invention relates in general to viewing images using a computer and more particularly to a system and a method for real-time correction of images captured by a wide-angle camera to alleviate distortion and perception problems associated with such images.

BACKGROUND OF THE INVENTION

Wide-angle cameras often are used to capture large scenes. Wide-angle cameras typically have a field-of-view greater than approximately 60 degrees. A wide-angle camera also includes a panoramic camera, which is an extremely wide-angle camera that has a field-of-view of up to 360-degrees.

A wide-angle image can be viewed using at least two types of projections. A linear perspective projection is an image captured by a wide-angle lens that is projected onto a flat piece of film. Linear perspective projection keeps straight lines straight at the expense of maintaining shape. This causes perspective deformations. The image would appear correct and not deformed if the viewer of the image placed their eye at the projection center. However, when viewing the wide-angle image with a smaller field-of-view the viewer expects smaller increases of image sizes as well as smaller amount of deformation on the image planes as the object rotates. This is why objects appear stretched at the edges. The large than expected changes in size and deformation on the image plane make the user feel that the scene is not rigid, as if the scene were swimming around the viewer, particularly when viewing panoramic images.

A cylindrical projection is produced using a wide-angle camera having curved film and a rotating slit lens. Cylindrical projections are better at maintaining shape than linear projections. In addition, a cylindrical projection mitigates any apparent swimming motion. Even though the cylindrical projection is a viewing improvement over the linear projection, however, distortion and perception problems are still present. In particular, the cylindrical projection curves straight lines more than necessary. In addition, the cylindrical projection removes, almost completely, the illusion of turning one's head when viewing panoramic images.

Distortion and curvature problems in wide-angle images are caused by a field-of-view mismatch. In particular, due to limited viewing size on computer monitors and standard viewing distances the angle subtended by the image when viewed is much smaller than the field-of-view of the camera that originally projected the scene to an image plane. This mismatch is the cause of many distortion and perception problems.

A related problem caused by a smaller field-of-view at viewing time is the misperception of depth. Wide-angle images exaggerate the depth disparity between near and far objects. One important visual cue of the depth of an object in a scene is the ratio between the image sizes of similar objects placed at near and far locations (called the depth foreshortening ratio). A smaller field-of-view results in a smaller foreshortening ratio. For example, assume a scene contains two persons standing next to each other with one person slightly further away from the camera than the other person. If the scene is captured by a regular (approximately 60 degree) field-of-view camera and the same scene is captured with a wide-angle field-of-view camera, the size of the objects in the scene will appear different. In particular, with a regular field-of-view camera, the person farther away from the camera will appear slightly further away from the camera than the other person. However, with the wide-angle field-of-view camera, the person farther away from the camera will appear much smaller than the other person. Because of this exaggerated size difference, the person farther away from the camera appears much farther away than he really is. When a wide-angle image of a deep scene (such as a video conferencing scene) is viewed on a computer monitor, the viewer's field-of-view, in general, is much smaller than the field-of-view of the actual images. Therefore, the depth perceived by the viewer is much larger than the actual depth.

One application where these distortion and perception problems manifest themselves is in video conferencing systems. Wide-angle cameras often are used in video conferencing systems to capture and transmit an image containing all participants present in a meeting room. One problem, however, is that when viewing the video conference the wide-angle image exaggerates the depth of the room. This causes the people in the middle of the image (who are usually furthest away from the camera) to appear very small compared to others in the room due to the extreme foreshortening.

These distortion and perception problems are even more apparent when viewing wide-angle images with current panorama viewing software. As a user (virtually) turns his head, objects appear at one edge already stretched out, then shrink depending on the distance as they pass the center. Finally, the objects are stretched out again at the other edge. This makes solid objects appear to deform and swim out and then in as the view is rotated.

Accordingly, there exists a need for a system and a method for real-time correction of images captured by a wide-angle camera to alleviate distortion and perception problems associated with such images.

SUMMARY OF THE INVENTION

The invention disclosed herein includes a system and a method for providing real-time correction of distortion and perception imperfections in a wide-angle image captured by a wide-angle camera. The real-time wide-angle image correction system and method use a class of parametric warping functions to effectively and efficiently correct distortion and perception errors in the wide-angle image. In addition, the system corrects depth errors, such as those present in video conferencing applications. Correction of depth errors allows more useful and meaningful video conferencing presentations. Moreover, the parametric warping functions can be used to eliminate swimming motion artifacts that occur when viewing wide-angle images.

In general, the real-time wide-angle image correction method inputs a flawed wide-angle image, corrects for exaggerated depth and horizontal distortion, and outputs a corrected wide-angle image. The corrections are performed using a class of warping functions that are designed to minimize the introduction of new distortions while overcoming a majority of problems associated with wide-angle cameras. This new class of warping functions includes Spatially Varying Uniform Scaling functions. Generally, scaling at the local level is performed while preserving the global context. For video conferencing applications, this means that the warp zooms in on distant people without distorting each individual and preserving the context of the room.

The real-time wide-angle correction method includes receiving pixel coordinates of a wide-angle image and performing vertical and horizontal scaling on pixel coordinates of the wide-angle image. The scaling is performed using the parametric image warping functions. This scaling yields a preliminary warp table that corresponds to an image that keeps vertical lines straight but may distort horizontal lines. In order to correct for this, the method includes performing a horizontal distortion correction on the preliminary warp table. The resulting output is a warp table that maps the corrected image pixel coordinates to original image pixel coordinates. In other words, the warp table dictates the position of each of the original pixel coordinates within a new, corrected wide-angle image. Using the warp table, the corrected wide-angle image is constructed in real time from the original wide-angle image. The corrected wide-angle image is virtually free of distortion and perception problems.

Vertical scaling is performed individually on each vertical scanline in the image using the parametric image warping functions and a warping factor. The main scaling factor is computed using source curves, a warping factor, and target curves computed from the source curves and warping factor. One aspect of the invention has the source curves and the warping factor defined by a user. The main scaling factor is used to scale the pixel coordinates in the vertical direction. In a virtual sense, this vertical scaling "stretches" the wide-angle image vertically for the selected vertical scanline by the amount of the main scaling factor. Horizontal scaling of the vertical scanline also is performed and uses the same main scaling factor to preserve aspect ratio. Similar to the vertical scaling, horizontal scaling can be thought of in a virtual sense as locally "stretching" the wide-angle image's vertical scanline horizontally by the amount of the main scaling factor. In a virtual sense, by applying the vertical and horizontal scaling to the original wide-angle image, we obtain a preliminary corrected image. To speed up computation, we generate a preliminary warp table which maps the preliminary pixel coordinates of the preliminary corrected image to the original image pixel coordinates.

Horizontal distortion is corrected by dividing the preliminary warp table into sections according to the positions of the pixel coordinates. Each of these sections is vertically scaled using different scaling factors. In one aspect of the invention, a first section is defined as containing those pixel coordinates corresponding to pixels located between a bottom source curve and a top source curve. The main scaling factor then is used to vertically scale the pixel coordinates in this section. The pixel coordinates in other sections are scaled vertically using a secondary scaling factor, which is a different value than the main scaling factor. In order to preserve continuity, each of the sections is connected using a smoothing function. Once the horizontal distortion correction process is performed on the pixel coordinates in the preliminary warp table, a warp table is generated. Using this warp table, real-time warping of a wide-image is performed to produce a corrected wide-angle image in real time.

A real-time wide-angle image correction system of the invention uses the method described above to provide real-time correction and viewing of a wide-angle image.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

The present invention includes a real-time wide-angle image correction system and method for obtaining and processing wide-angle images such that the output is an undistorted, corrected wide-angle image. The real-time wide-angle image correction system and method can be used to view wide-angle images without the stretching, curvature distortions, and exaggerated depth problems that plague traditional wide-angle images. Correction of the wide-angle image is achieved using a new class of parametric warping functions. In one aspect of the invention, these parametric warping functions are Spatially Varying Uniform (SVU) scaling functions that preserve local scaling perspectives and correct for depth misperception. The SVU scaling functions and scaling factors are used to perform vertical scaling and horizontal scaling on the pixel coordinates of the image. This produces a preliminary warp table which maps the pixel locations of the preliminary corrected image to the original pixel coordinates. This preliminary corrected image is a virtual image and is not actually constructed. However, the preliminary corrected image maintains vertical lines as straight but distorts horizontal lines. This horizontal distortion is corrected by performing a horizontal distortion correction using the SVU scaling functions and at least two different scaling factors. This processing yields a warp table. The warp table maps positions in a corrected wide-angle image to the original pixel coordinates in the distorted wide-angle image. Using the warp table, the corrected wide-angle image is constructed in real time from the original wide-angle image.

Figure 1:
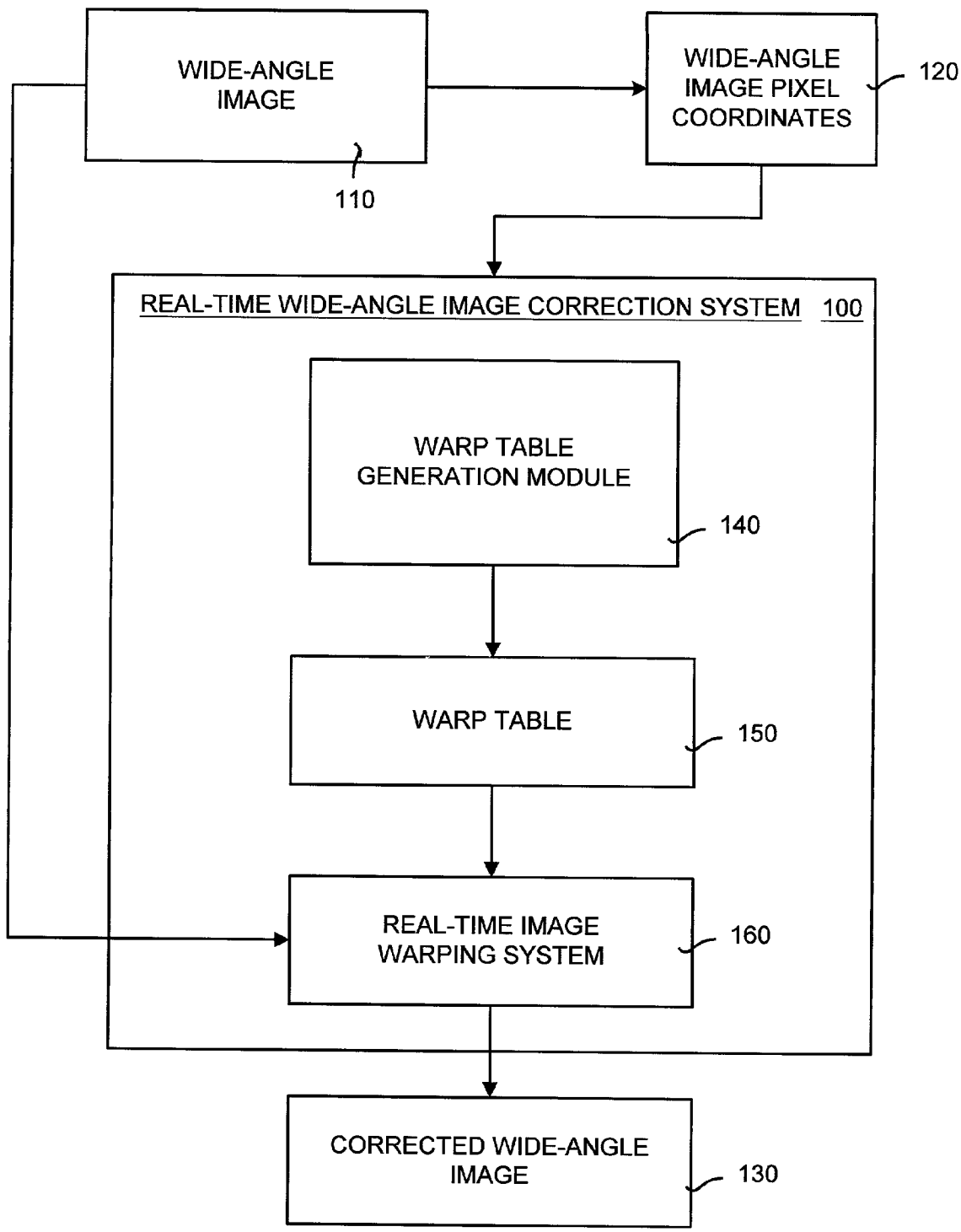
FIG. 1 is a block diagram illustrating the general overview of the real-time wide-angle image correction system of the invention.

FIG. 1 is a block diagram illustrating the general overview of the real-time wide-angle image correction system 100 of the invention. In general, the system 100 obtains a wide-angle image 110 and inputs the wide-angle image pixel coordinates 120 corresponding to the coordinates of each of the pixel within the wide-angle image. The wide-angle image pixel coordinates 120 are processed by the real-time wide-angle image correction system 100 and a corrected wide-angle image 130 is the output.

The wide-angle image 110 may be a single image (such as from a still camera) or part of a sequence of images (such as from a video camera). The coordinates of each pixel within the wide-angle image 110 are obtained to generate the wide-angle image pixel coordinates 120. For example, in a rectilinear coordinate frame the pixel coordinates 120 are (x, y) locations of each of the pixels within the wide-angle image 110. The real-time wide-angle image correction module 100 includes a warp table generation module 140, a warp table 150, and a real-time image warping system 160.

The warp table generation module 140 is used to generate the warp table 150 using parametric image warping functions. The wide-angle image pixel coordinates 120 are processed to create the warp table 150. The details of the warp table generation module 140 are discussed below. The warp table 150 contains the wide-angle image pixel coordinates 120 arranged in such a way to correspond to a location in the corrected wide-angle image 130. Thus, the warp table 150 determines the new location in the corrected wide-angle image 130 for the wide-angle image pixel coordinates 120.

Once the warp table 150 is generated the wide-angle image 110 is received as input to the real-time warping system 160. The real-time image warping system 160 applies the warp table 150 to the wide-angle image 110 to create the corrected wide-angle image 130. The real-time warping system 160 creates the corrected wide-angle image 130 by for each location in the corrected wide-angle image 130 obtaining the RGB values for the wide-angle image 110 located at the pixel coordinates contained in the warp table 150. The RGB values at the wide-angle pixel coordinates 120 are thus relocated in the corrected wide-angle image 130. The new location is determined using the warp table 150.

The warping process occurs in real-time because the generation of the warp table means that all that is required to create the corrected wide-angle image 130 is to apply the warping table 150 to the wide-angle image 110, which can be done quickly. In summary, the real-time wide-angle image correction system 100 generates a warp table by processing the wide-angle image pixel coordinates 120 and then creates the corrected wide-angle image 130 from the wide-angle image 110 using the warp table 150.

II. Exemplary Operating Environment

The real-time wide-angle image correction system 100 of the present invention is designed to operate in a computing environment. The following discussion is intended to provide a brief, general description of a suitable computing environment in which the invention may be implemented.

Figure 2:
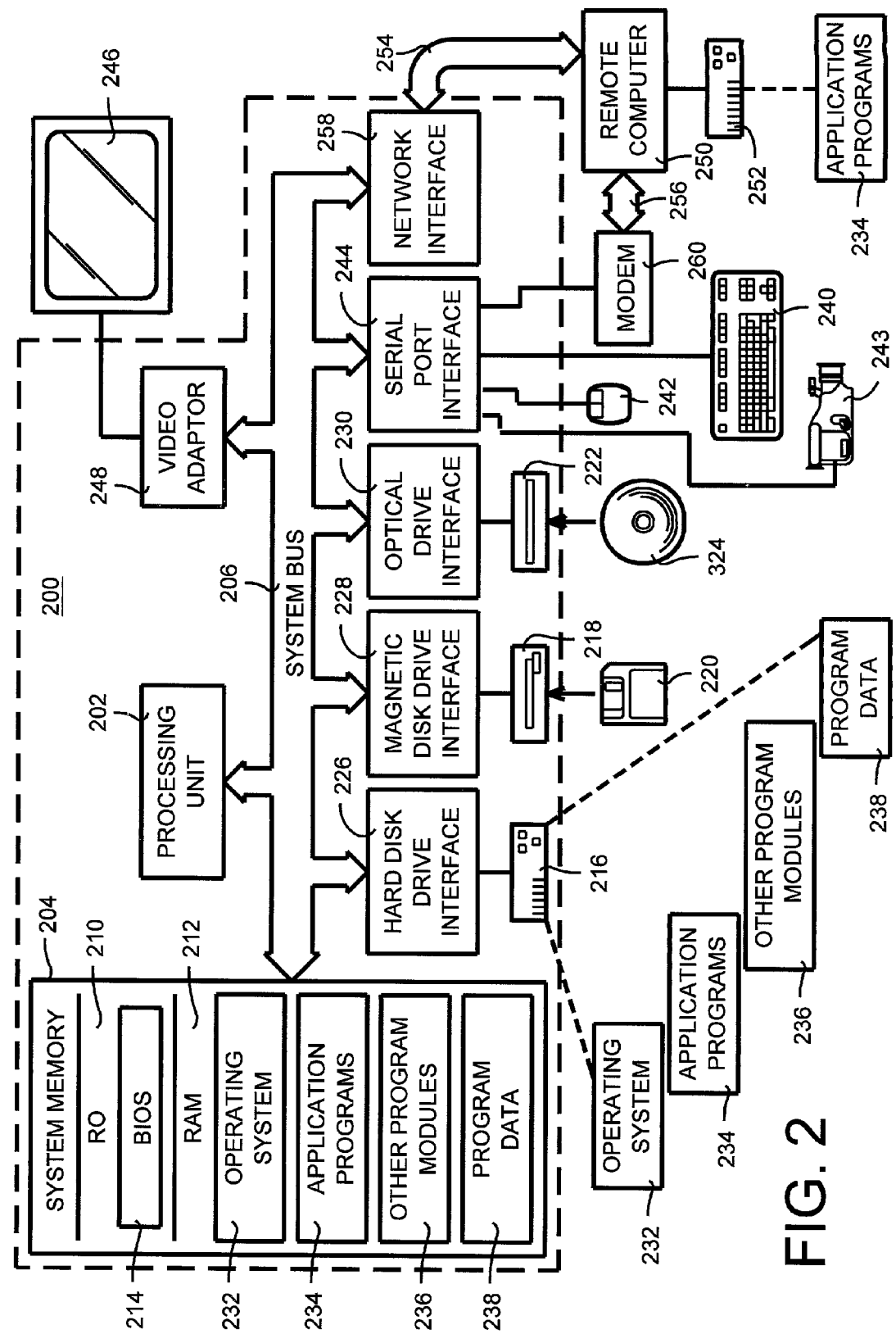
FIG. 2 is a block diagram illustrating a computing apparatus suitable for carrying out the invention.

FIG. 2 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 2, an exemplary system for implementing the invention includes a general-purpose computing device 200. In particular, the computing device 200 includes the processing unit 202, a system memory 204, and a system bus 206 that couples various system components including the system memory 204 to the processing unit 202. The system bus 206 may be any of several types of bus structures including a memory bus or memory controller, a peripheral bus, and a local bus using any of a variety of bus architectures. The system memory includes read only memory (ROM) 210 and random access memory (RAM) 212. A basic input/output system (BIOS) 214, containing the basic routines that help to transfer information between elements within the computing device 200, such as during start-up, is stored in ROM 210. The computing device 200 further includes a hard disk drive 216 for reading from and writing to a hard disk, not shown, a magnetic disk drive 218 for reading from or writing to a removable magnetic disk 220, and an optical disk drive 222 for reading from or writing to a removable optical disk 224 such as a CD-ROM or other optical media. The hard disk drive 216, magnetic disk drive 228 and optical disk drive 222 are connected to the system bus 206 by a hard disk drive interface 226, a magnetic disk drive interface 228 and an optical disk drive interface 230, respectively. The drives and their associated computer-readable media provide nonvolatile storage of computer readable instructions, data structures, program modules and other data for the computing device 200.

Although the exemplary environment described herein employs a hard disk, a removable magnetic disk 220 and a removable optical disk 224, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 220, optical disk 224, ROM 210 or RAM 212, including an operating system 232, one or more application programs 234, other program modules 236 (such as the wide-angle image de-warping system 100) and program data 238. A user (not shown) may enter commands and information into the computing device 200 through input devices such as a keyboard 240 and a pointing device 242. In addition, a camera 243 (such as a video camera) may be connected to the computing device 200 as well as other input devices (not shown) including, for example, a microphone, joystick, game pad, satellite dish, scanner, or the like. These other input devices are often connected to the processing unit 202 through a serial port interface 244 that is coupled to the system bus 206, but may be connected by other interfaces, such as a parallel port, a game port or a universal serial bus (USB). The monitor 246 (or other type of display device) is also connected to the system bus 206 via an interface, such as a video adapter 248. In addition to the monitor 246, computing devices such as personal computers typically include other peripheral output devices (not shown), such as speakers and printers.

The computing device 200 may operate in a networked environment using logical connections to one or more remote computers, such as a remote computer 250. The remote computer 250 may be another personal computer, a server, a router, a network PC, a peer device or other common network node, and typically includes many or all of the elements described above relative to the computing device 200, although only a memory storage device 252 has been illustrated in FIG. 2. The logical connections depicted in FIG. 2 include a local area network (LAN) 254 and a wide area network (WAN) 256. Such networking environments are commonplace in offices, enterprise-wide computer networks, intranets and the Internet.

When used in a LAN networking environment, the computing device 200 is connected to the local network 254 through a network interface or adapter 258. When used in a WAN networking environment, the computing device 200 typically includes a modem 260 or other means for establishing communications over the wide area network 256, such as the Internet. The modem 260, which may be internal or external, is connected to the system bus 206 via the serial port interface 244. In a networked environment, program modules depicted relative to the computing device 200, or portions thereof, may be stored in the remote memory storage device 252. It will be appreciated that the network connections shown are exemplary and other means of establishing a communications link between the computers may be used.

III. System Details

In general, the real-time wide-angle image correction system 100 provides real-time correction of a wide-angle image 110. The system 100 corrects for curvature and distortions in the vertical and the horizontal directions. In addition, the system 100 corrects for perception problems such as depth and swimming motions.

Figure 3:
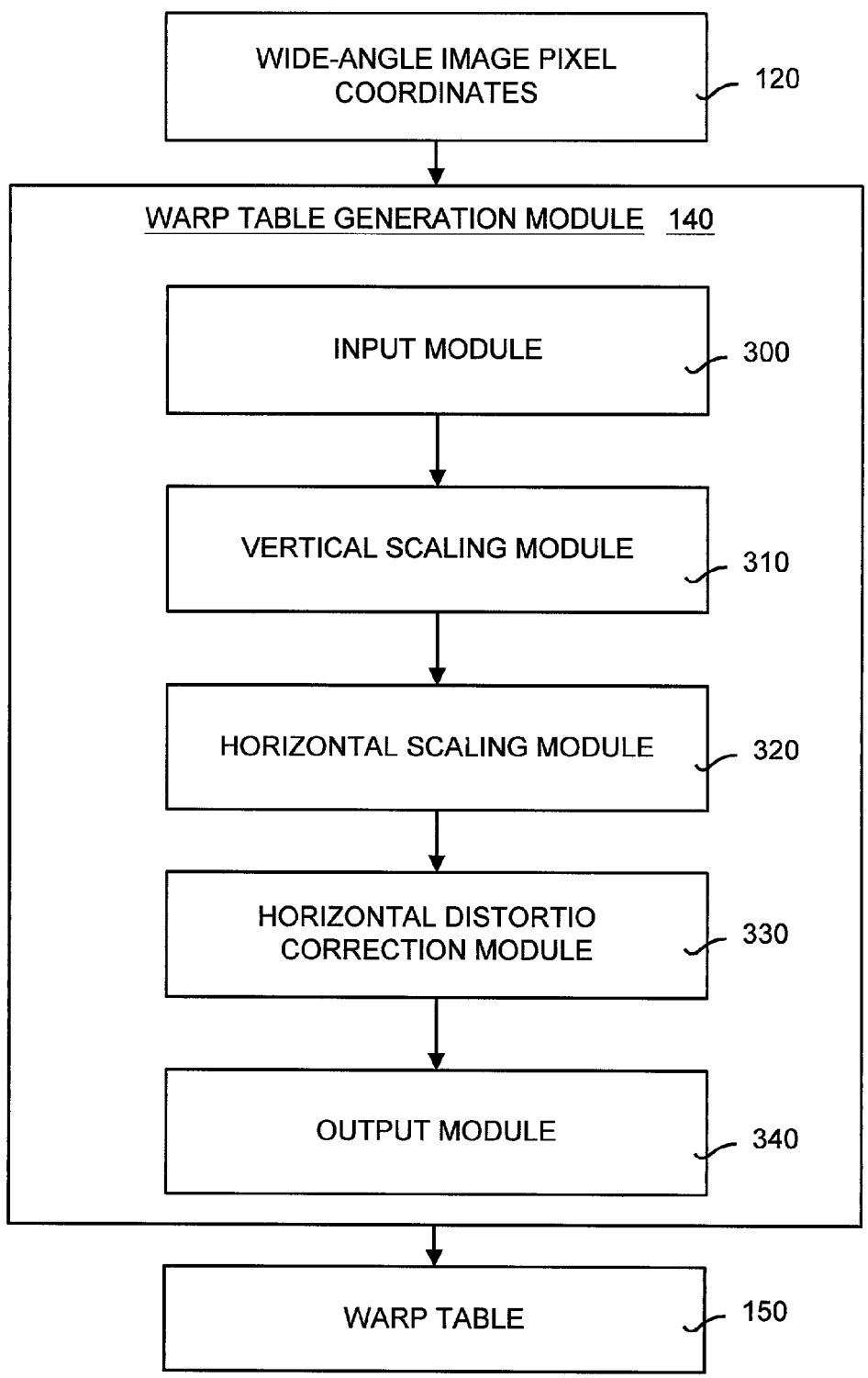
FIG. 3 is a block diagram illustrating the details of the warp table generation module of the real-time wide-angle image correction system shown in FIG. 1.

FIG. 3 is a block diagram illustrating the details of the warp table generation module 140 shown in FIG. 1. In particular, the warp table generation module 140 includes an input module 300 for inputting the wide-angle image pixel coordinates 120. These pixel coordinates 120 represent a location of each pixel in the wide-angle image 110. It should be noted that the image 110 can be a single image or one of a sequence of images, such as a video sequence from a video camera. The module 140 also includes a vertical scaling module 310. The vertical scaling module 310 uses warping functions to process each vertical scanline of the wide-angle image pixel coordinates 120 such that the wide-angle image pixel coordinates 120 are scaled in a vertical direction. Conceptually, this can be thought of as "stretching" the wide-angle image 110 in the vertical direction. This vertical scaling corrects in part for exaggerated depth in the wide-angle image 110.

The warp table generation module 140 also includes a horizontal scaling module 320 for using parametric image warping functions to scale the wide-angle image pixel coordinates 120 in the horizontal direction. Similar to the vertical scaling, conceptually this can be though of as "stretching" the wide-angle image 110 in the horizontal direction. In addition, the horizontal scaling is performed individually on each vertical scanline such that aspect ratio of the wide-angle image 110 is preserved.

The vertical scaling module 310 and the horizontal scaling module 320 create a preliminary warp table which maps the preliminary pixel coordinates to the original pixel coordinates. This preliminary warp table could be used to create a preliminary corrected image. In practice this is not done, and the preliminary corrected image is a virtual image. The preliminary corrected image has the properties that vertical lines are maintained as vertical but horizontal lines are distorted.

In order to correct for this horizontal distortion, a horizontal distortion module 330 also is included in the warp table generation module 140. The horizontal distortion module 330 vertically scales the preliminary pixel coordinates in the preliminary warp table by different amounts depending on location. The output of the warp table generation module 140 is the warp table 150. The warp table maps the pixel coordinates in the corrected wide-angle image 130 to the original wide-angle image pixel coordinates 120.

IV. Wide-Angle Image Correction Operational Overview

The real-time wide-angle image correction method of the present invention makes use of a parametric class of image warping functions. These parametric image warping functions attempt to minimize the image perception problems caused by a viewer having smaller field-of-view than an imaging apparatus. The parametric class of image warping functions is called Spatially Varying Uniform Scaling functions, or SVU scaling functions. Although SVU scaling functions may locally resemble a uniform scaling function to preserve aspect ratios, the scaling factor varies over the image to create warp. In addition, the class of conformal projections can provide local uniform scaling, but these functions introduce rotations, which are visually disturbing. SVU scaling functions avoid rotations and remove swimming motions when viewing panoramic images.

Figure 4:
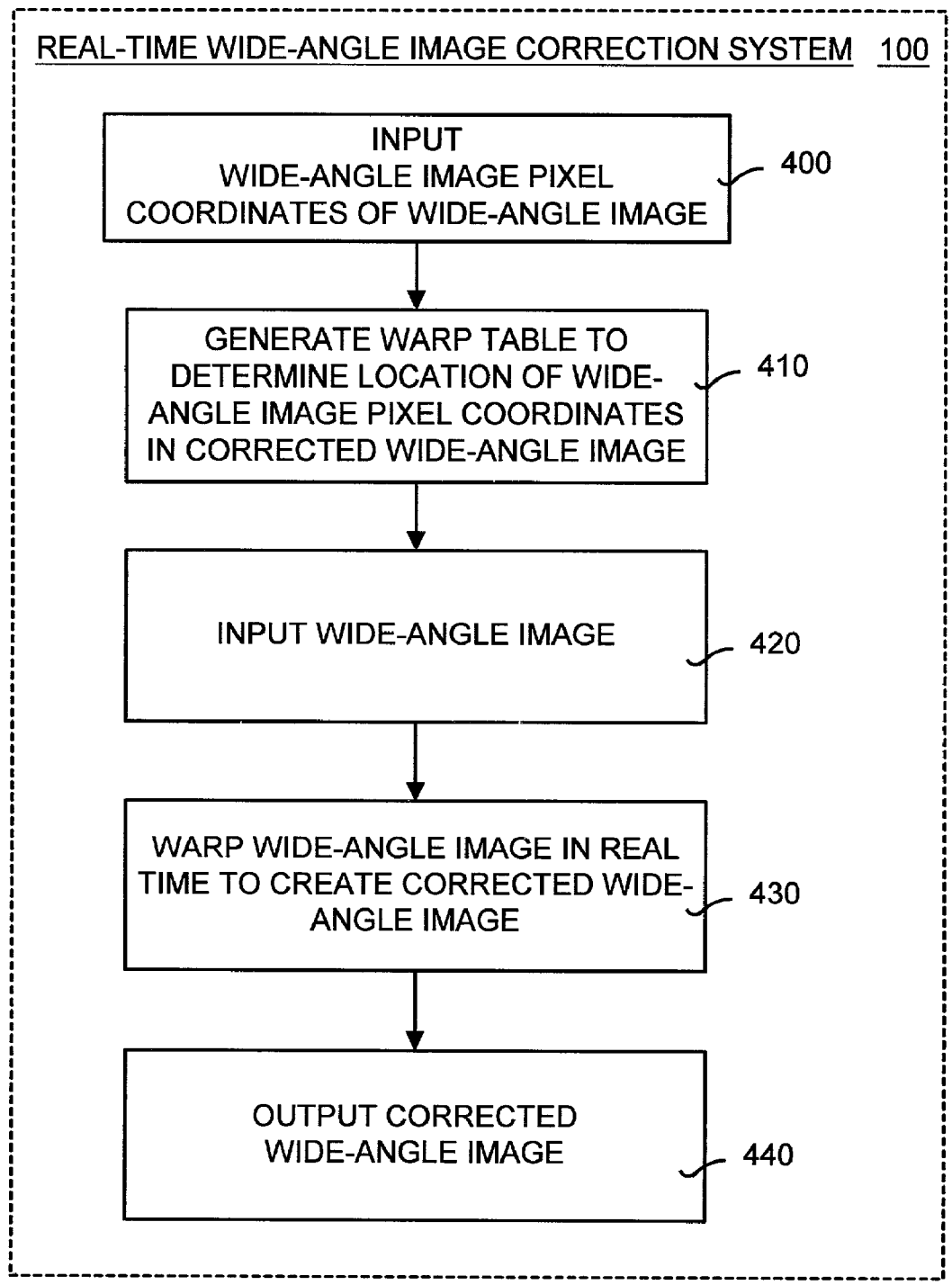
FIG. 4 is a general flow diagram illustrating the operation of the real-time wide-angle image correction system shown in FIG. 1.

FIG. 4 is a general flow diagram illustrating the operation of the real-time wide-angle image correction method of the real-time wide-angle image correction system 100 shown in FIG. 1. In general, the method generates a warp table from wide-angle image pixel coordinates and processes a wide-angle image using the warp table to create a corrected wide-angle image. More specifically, wide-angle image pixel coordinates 120 from the wide-angle image 110 are received as input (box 400). Next, the warp table 150 is generated (box 410). This warp table 150 is used to determine a location of the corrected wide-angle image pixel coordinates 130 in the wide-angle image pixel coordinates 120.

As discussed in detail below, the generation of warp table 150 includes vertical scaling, horizontal scaling, and horizontal distortion correction. Vertical scaling corrects the wide-angle image 110 for exaggerated depth. In order to correct for exaggerated depth, the distant objects or people in the center of the wide-angle image 110 need to be enlarged relative to those objects or people who are close to the camera. In other words, the warping functions should be such that they zoom up the center more than the sides while locally mimicking a uniform scaling. The SVU scaling functions maintain vertical lines as vertical.

In order to maintain aspect ratio of the wide-angle image 110 horizontal scaling is also performed. Specifically, parametric image warping functions (such as the SVU scaling functions) are used to perform horizontal scaling to generate a new width for each vertical scanline for the wide-angle image 110. While the SVU scaling functions maintain vertical lines as vertical, they induce a certain amount of vertical shear. Visually, this is perceived as slanting and distorted horizontal lines. Scenes often contain horizontal surfaces near the top or bottom of the image, such as a table and a ceiling on a room. for which the distortions may be noticeable.

In order to correct for this vertical shear, the real-time wide-angle image correction method further includes performing horizontal distortion correction to correct the wide-angle image 110 for horizontal distortion. In general, this is accomplished by relaxing the uniformity of the vertical scaling and nonlinearly scaling at a vertical location in the wide-angle image 110 (such as along a vertical scanline). After the vertical scaling, horizontal scaling, and horizontal distortion correction, the warp table 150 is generated that maps a pixel in the corrected wide-angle image 130 to the wide-angle image 110.

Once the warp table 150 has been generated, the wide-angle image 110 is received as input (box 420). The wide-angle image 110 then is warped in real time to create the corrected wide-angle image 130. The warp table established where a pixel in the wide-angle image 110 is to be found for each position in the corrected wide-angle image 130 to produce a distortion-free wide-angle image.

Figure 20:
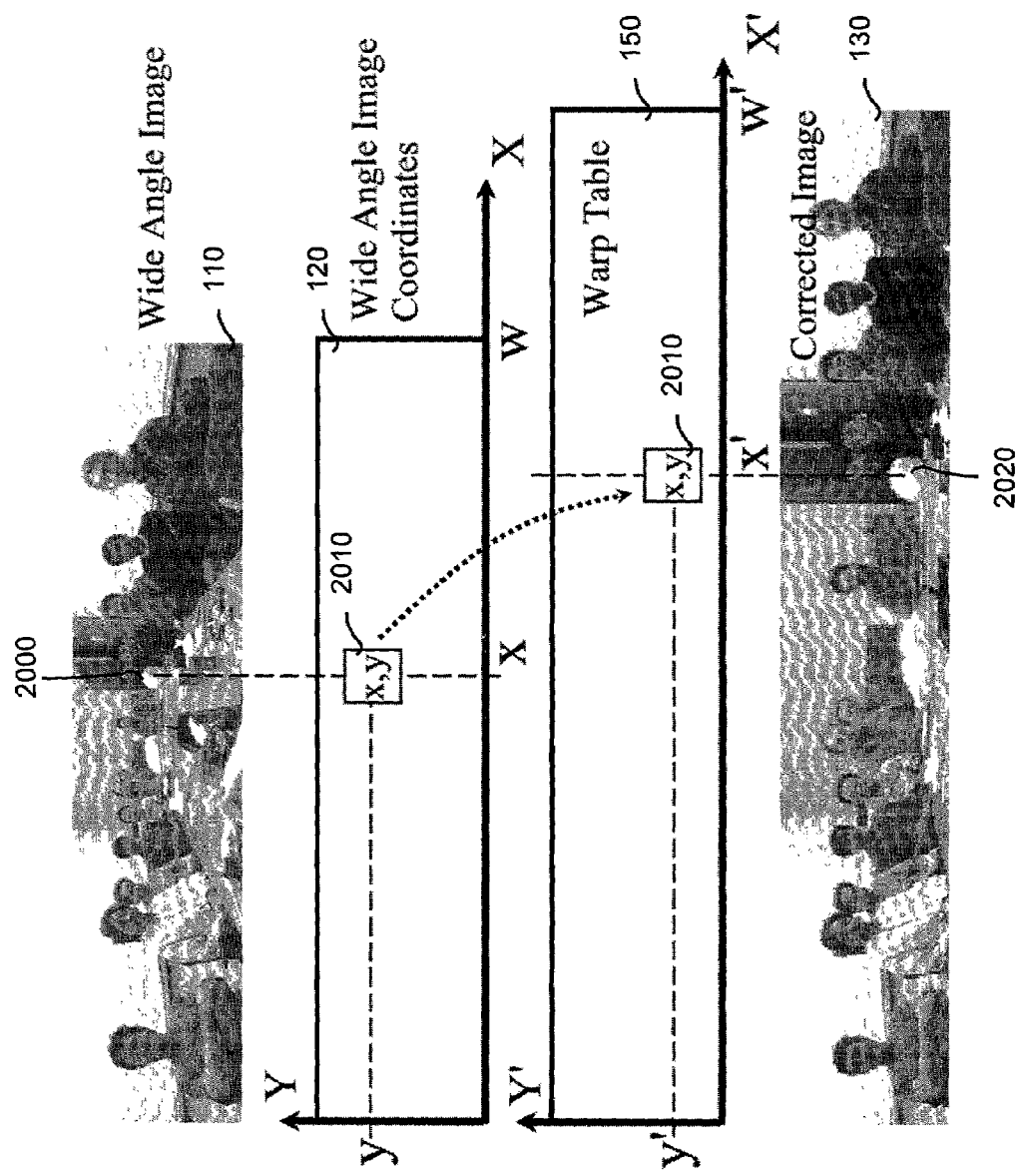
FIG. 20 illustrates an example of the operation of the real-time wide-angle image correction method as shown in FIG. 4.

In order to more fully understand the real-time wide-angle image correction method of the invention, an example is presented. FIG. 20 illustrates an example of the operation of the real-time wide-angle image method as shown in FIG. 4. In particular, the wide-angle image 110 containing a scene of a video conference captured by a wide-angle camera (not shown) is received for processing.

Next, the coordinates of each pixel within the wide-angle image 110 are determined. In this example, a rectilinear coordinate system having a vertical axis Y and an horizontal axis X is constructed to applied to the wide-angle image 110. The width of the source wide-angle image is w. A pixel 2000 from the wide-angle image 110 is represented in the wide-angle image pixel coordinates 120 by pixel coordinates (x, y) (box 2010). It should be noted that x represents the horizontal location of the pixel 2000 along the X axis and y represents the vertical location of the pixel 2000 along the Y axis.

The warp table 150 then is generated to determine a location of the pixel coordinates 2010 within the corrected image 130. As shown in FIG. 20, the warp table has a second rectilinear coordinates system having a vertical axis Y' and a horizontal axis X'. The width of the corrected image 130 is w'. Using the parametric image warping functions and scaling factors described in detail below, the pixel coordinates 2010 are placed at a location within the corrected image to signify the pixel coordinates location in the corrected image 130. As shown FIG. 20, the location of the pixel coordinates 2010 in the warp table is given by the corrected pixel coordinates (x',y'). Once again, it should be noted that x' represents the horizontal location of the pixel coordinates 2010 along the X' axis and y' represents the vertical location of the pixel coordinates 2010 along the Y' axis.

The corrected image 130 is create in real time by using the warp table to map the location of the pixel 2000 (of the wide-angle image 110) to a corrected pixel 2020 located in the corrected image 130. Once the location of the pixel 2000 in the corrected image 130 is determined, the RGB value of the pixel 2000 can be applied to the corrected pixel 2020 in the corrected image 130. In this manner, the wide-angle image 110 can be corrected in real time to create the corrected image 130 that is virtually free of distortion and other perception problems generally associated with wide-angle images.

V. Operational Details

The real-time wide-angle image correction method processes a wide-angle image in real time to correct distortion and perception problems associated with wide-angle images. The correction processing is performed using a parametric class of image warping functions having scaling factors. These parametric image warping functions and scaling factors are used to generate a warp table, which is applied directly to the wide-angle image. In one aspect of the invention, the wide-angle image is a cylindrical projection. Also, in one aspect of the invention the parametric image warping functions are SVU scaling functions.

Vertical Scaling

Figure 5:
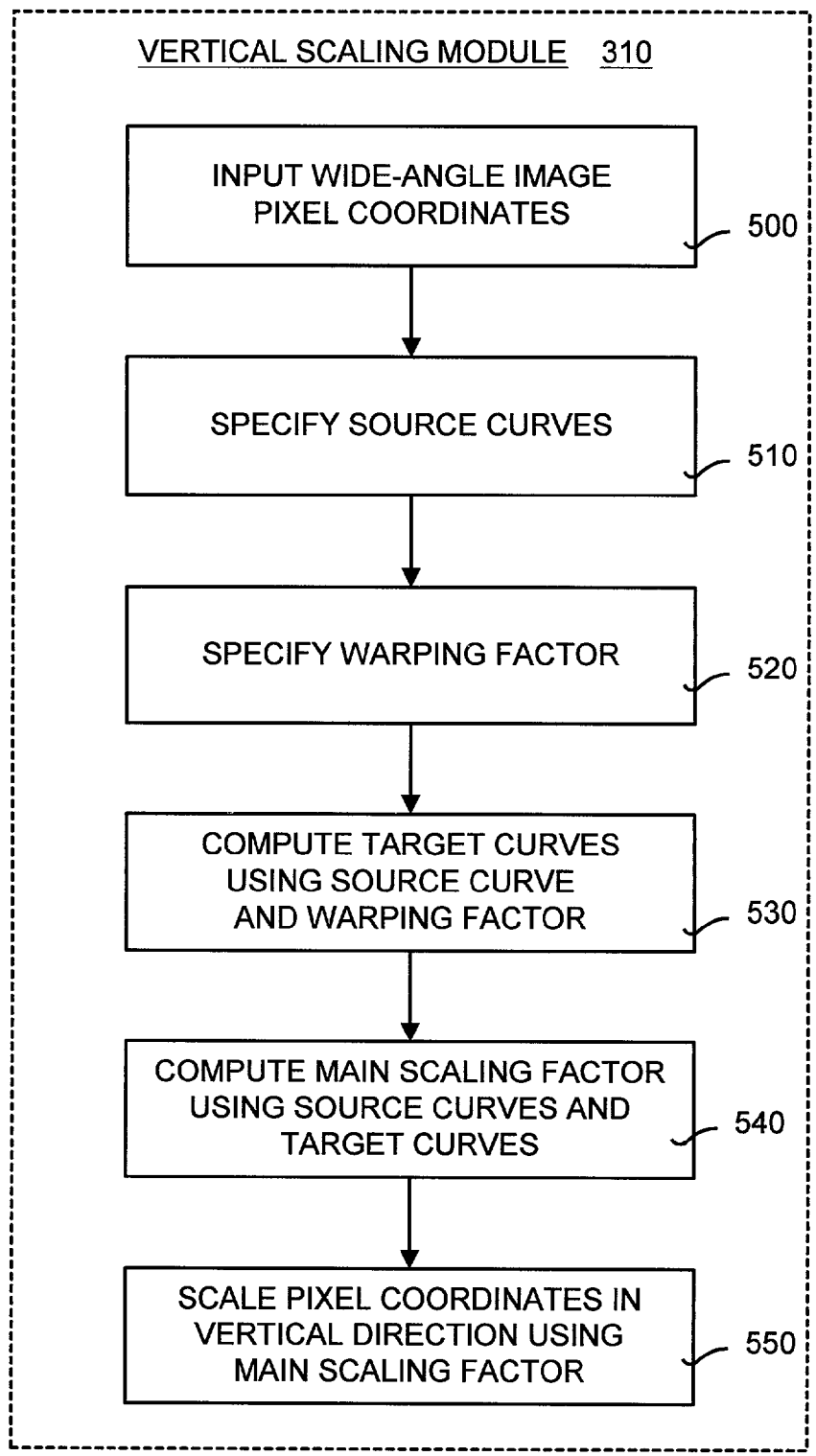
FIG. 5 is a flow diagram illustrating the details of the vertical scaling module shown in FIG. 3.

FIG. 5 is a flow diagram illustrating the details of the vertical scaling module shown 310 in FIG. 3. The wide-angle pixel coordinates 120 are received as input (box 500). Next, parametric image warping functions (such as SVU scaling functions) are determined using a set of curves and scaling factors. In particular, source curves are specified (box 510) along with a warping factor (box 520). Using these source curves and the warping factor, target curves are computed (box 530).

Figure 6:
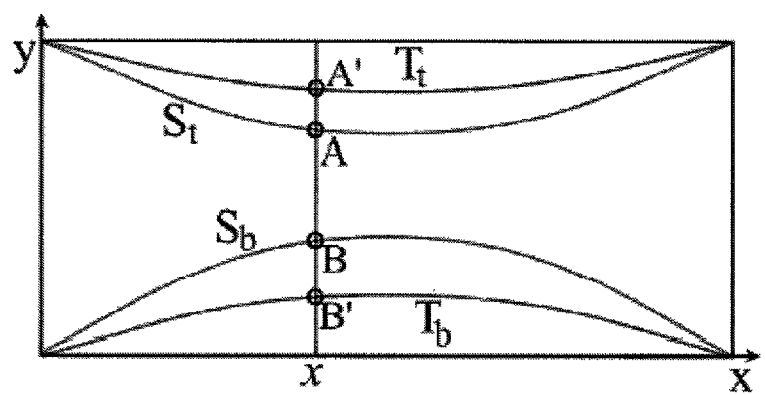
FIG. 6 illustrates the determination of the warping function by two sets of curves.

FIG. 6 illustrates the determination the warping function by two sets of curves: (1) source curves; and (2) target curves. In one aspect of the invention, the source curves are by a user via a simple user interface. These source curves provide the parameters for the parametric image warping function. Through the user interface a user is asked to define two cubic curves. These two source curves define common (real world) horizontal features, such as the tops of people's heads, and the edge of the table. As shown in FIG. 6, a top source curve $S_t$ and a bottom source curve $S_b$ are specified.

The warping factor, $\alpha$, which can also be chosen by the user, determines how much the image is warped. The warping factor, $\alpha$, lies between 0 and 1, where $\alpha$=0 is no warping and $\alpha$=1 is the maximum warping. Conceptually, specifying $\alpha$=0 will leave the image untouched, and specifying $\alpha$=1 will pull pixels on source curves to the lines between the end points. Typically, the ideal warping factor lays approximately half way between 0 and 1.

Once the source curves and the warping factor are specified, the target curves can be computed (box 530). Let $y=S_t(x)$ and $y=S_b(x)$ be the equations of the top and bottom source curves respectively. Two target curves (where points on the source curve will move to) are determined by the source curves and $\alpha$. Specifically, a top target curve $T_t$ and a bottom target curve $T_b$ are defined. If an equation of the line is defined between the end points of $S_t(x)$ as $y=y_t(x)$, and the equation of line connecting the bottom source ends as $y=y_b(x)$, then the equation of the top target curve is $T_t(x) = (1-\alpha)S_t(x)+\alpha y_t(x)$, and $T_b(x)=(1-\alpha)S_b(x)+\alpha y_b(x)$.

A main scaling factor, $r(x)$, then is computed using the source curves and the target curves (box 540). In particular, given any vertical scanline x as shown in FIG. 6, let A, B denote its intersections with the source curves, and A', B' the intersections with the target curves. The SVU scaling function will scale AB to A'B'. Let $$r(x) = \frac{\|A'B'\|}{\|AB\|} \qquad (1)$$
$$= \frac{T_t(x) - T_b(x)}{S_t(x) - S_D(x)}$$

The ratio, $r(x)$, is a main scaling factor for a vertical scanline located at horizontal position x. The wide-angle pixel coordinates 120 of the vertical scanline then are scaled in the vertical direction using the main scaling factor, $r(x)$ (box 550).

Horizontal Scaling

In order to preserver aspect ratio, the wide-angle pixel coordinates 120 also are scaled in the horizontal direction. This horizontal scaling uses the same main scaling factor, $r(x)$. In other words, just as for the vertical scaling a vertical scanline is also scaled horizontally by the main scaling factor, $r(x)$, to preserve aspect ratio.

Figure 7:
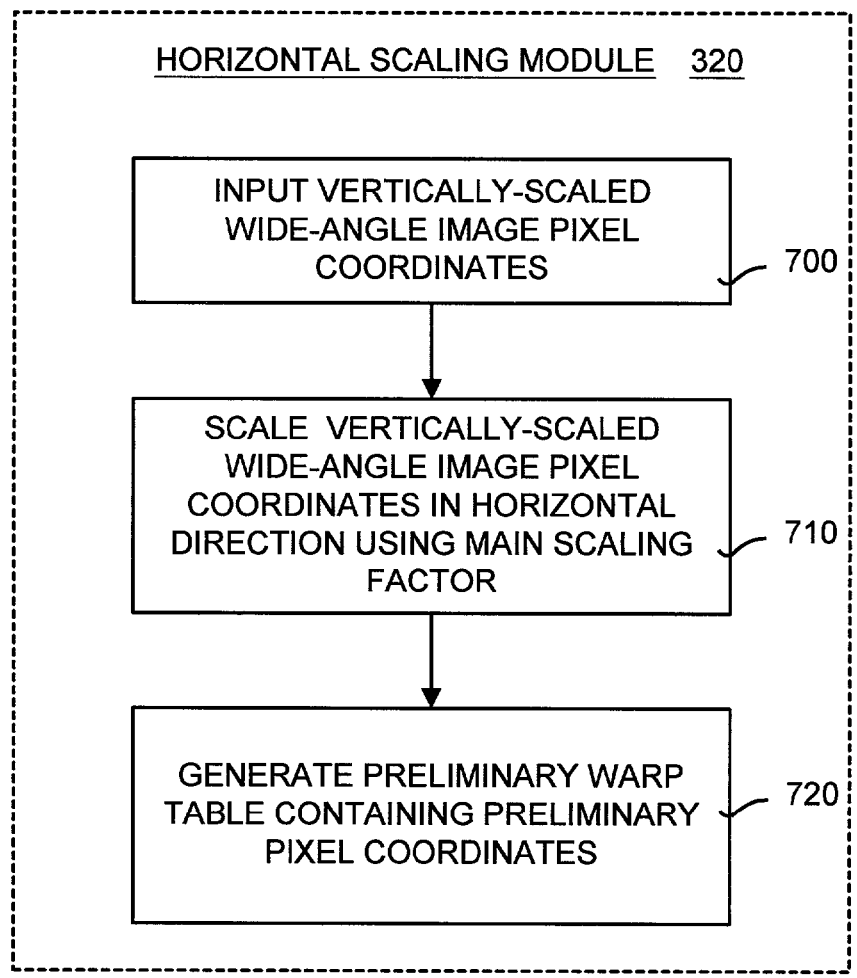
FIG. 7 is a flow diagram illustrating the details of the horizontal scaling module shown in FIG. 3.

FIG. 7 is a flow diagram illustrating the details of the horizontal scaling module shown in FIG. 3. The vertically-scaled wide-angle pixel coordinates are received as input (box 700). Using the main scaling factor, $r(x)$, the vertically-scaled wide-angle pixel coordinates are scaled in the horizontal direction (box 710). Once the vertically-scaled wide-angle pixel coordinates 120 are scaled, the total width of a preliminary corrected image, w', becomes, $$\omega' = \int_u^\omega r(x)\,dx \qquad (2)$$

where w is the width of the wide-angle (or source) image 110.

Next, a preliminary warp table is generated (box 720). The preliminary warp table contains preliminary pixel coordinates. The preliminary pixel coordinates are the wide-angle pixel coordinates that have been vertically and horizontally scaled. Conceptually, the preliminary pixel coordinates can be used to construct a preliminary corrected image. Thus, for any pixel (x, y) in the wide-angle image 110, let (x', y') denote its new position in the preliminary corrected image. This yields, $$x' = \int_0^x r(x)\,dx \qquad (3)$$
$$y' = T_t(x) + r(x) * (y - S_t(x))$$

Equation (3) is the forward mapping equation for the SVU scaling function. The SVU scaling function is not a perfect uniform scaling everywhere. It is easy to prove that the only function that is a perfect uniform scaling everywhere is a uniform global scaling function.

The SVU scaling function is similar to a projection onto a generalized cylindrical surface. However, as shown in Appendix II, such a simple projection does not produce locally uniform scaling. Local uniform scaling is desirable, and this lack of local uniform scaling causes objects in the preliminary corrected image to appear to be stretched.

Horizontal Distortion Correction

Once the wide-angle pixel coordinates 120 have been scaled in the vertical and the horizontal directions, the resulting preliminary warp table is corrected for horizontal distortion. Horizontal distortion correction is needed because, while the parametric class of image warping functions (such as a SVU scaling function) maintains vertical lines as vertical, they distort horizontal lines. To minimize this problem the uniformity of the scaling is relaxed and nonlinearly scaled at each vertical scanline.

Figure 8:
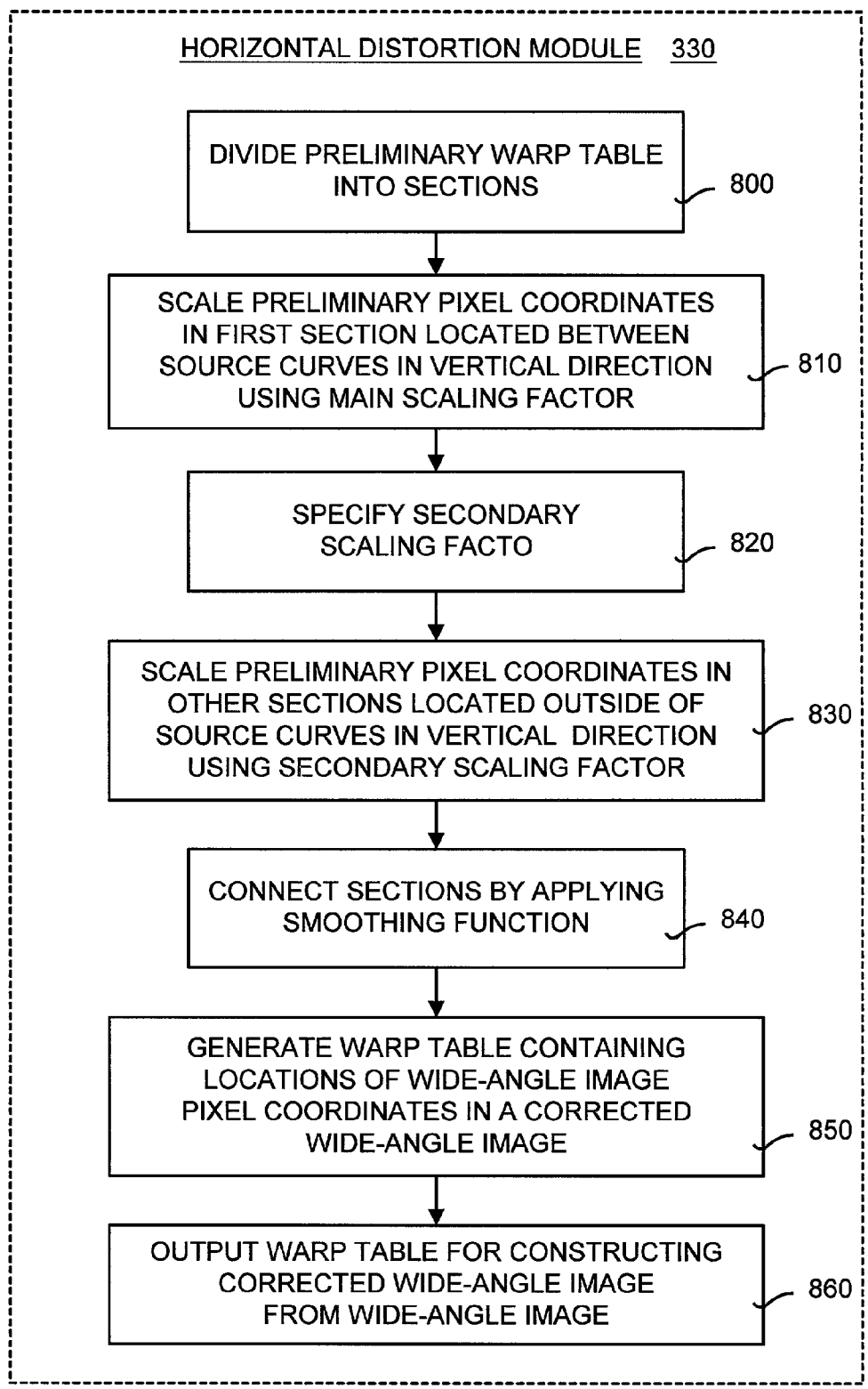
FIG. 8 is a flow diagram illustrating the details of the horizontal distortion correction module shown in FIG. 3.

FIG. 8 is a flow diagram illustrating the details of the horizontal distortion module 330 shown in FIG. 3. In general, the module 330 divides the preliminary pixel coordinates in the preliminary warp table into sections and scales each section in the vertical direction according to a specific scaling factor for that section. The scaling factors may be different between sections, and are usually different for at least one section.

Figure 9:
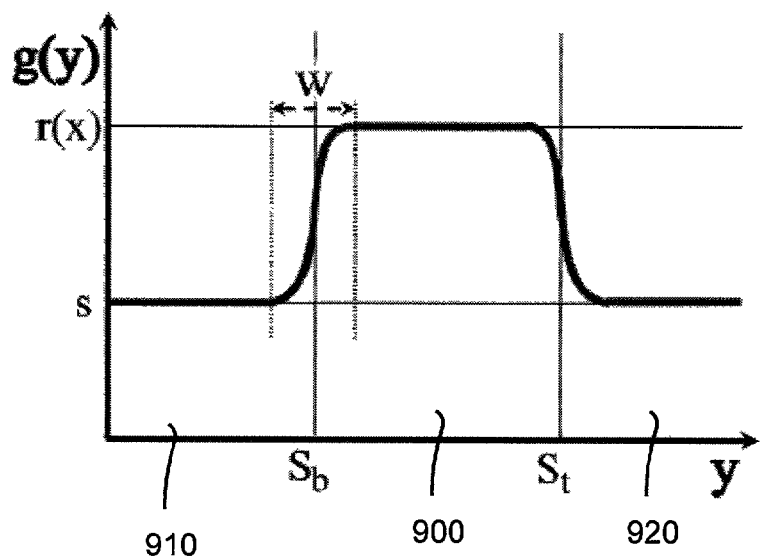
FIG. 9 illustrates the vertical scaling function and a conceptual view of the division of the preliminary pixel coordinates into three sections.

Specifically, the horizontal distortion correction module 330 initially divides the preliminary warp table into sections (box 800). In one aspect of the invention, the preliminary corrected image is conceptually divided as shown in FIG. 9. FIG. 9 illustrates the vertical scaling function and a conceptual view of the division of the preliminary corrected image into three sections. It should be noted that in FIG. 9 y is the vertical direction. Referring to FIG. 9, a first section 900 is defined between the bottom source curve $S_b$ and the top source curve $S_t$. Other sections include section outside the source curves including a second section 910 below the source curves and a third section 920 above the source curves.

The preliminary pixel coordinates located in the first section 900 between the source curves are scaled in the vertical (y) direction using the main scaling factor, $r(x)$ (box 810). This scaling in the vertical direction is performed as described above. The preliminary pixel coordinates located in the sections outside the source curves (the second section 910 and the third section 920) are scaled less in the vertical direction. This is performed by initially specifying a secondary scaling factor (box 820). The secondary scaling factor, s, is shown in FIG. 9 below the main scaling factor, r(x). Next, the preliminary pixel coordinates located in other sections 910, 920 outside of the source curves are scaled in the vertical direction using the secondary scaling factor (box 830). It should be noted that the horizontal scaling remains the same (in other words, using the main scaling factor, r(x)) so that the straightness of vertical lines is maintained. In order to maintain continuity between sections, transitions between sections are made by applying a smoothing parameter, w (box 840). The smoothing parameter smoothes the vertical scaling function and smoothly connects the disparate scaling factors as the vertical scaling function crosses the source curves.

Referring to FIGS. 6 and 9, consider the vertical line at x shown in FIG. 6 As shown in FIG. 9, g(y) is the vertical scaling function that can be defined to be the vertical scaling factor at any point y on this vertical line. It should be noted that g(y) is dependent on x. The function g(y) is controlled by two parameters, the secondary scaling factor, s, and the smoothing parameter, w. The portion of the vertical scanline more than w/2 distance from the source curves is scaled by the main scaling factor, r(x), between the source curves and by the secondary scaling factor, s, outside the source curves. The three constant segments are glued together by two cubic splines in [$S_r$–0.5w, $S_r$+0.5w]. Each cubic spine has ends with values s and r(x) and a slope of 0 at both ends.

The smoothing parameter w controls the continuity at the source curves. For example, if the scene is discontinuous at the source curves, one can choose a very small w without noticeable artifacts. In the special case when s=r(x), g(y) becomes a constant, which is what was assumed in deriving Equation (3). Once the horizontal distortion correction function has been applied to the preliminary warp table, the warp table 150 is generated that contains the locations of the wide-angle pixel coordinates in the corrected wide-angle image 130 (box 850). The warp table 150 then is sent as output (box 860). The warp table is used for constructing the corrected wide-angle image 130 from the wide-angle image 110.

Correction for Wide-Angle Image Viewing Misperception

Swimming motions can be thought of as a special type of depth misperception. As the scene rotates, the viewer, with a smaller field of view, sees unexpected changes in the size of objects as they cross the field of view. An object looks too large as it first comes into view due to geometric distortion, then it is too small in the center of the view due to exaggerated foreshortening, and finally is too large again as it leaves the view. The result is that objects appear move away form the viewer and then move back towards the viewer/In other words, the object appears to "swim".

The SVU scaling function helps correct for the problems of depth misperception. This is achieved by using a symmetric SVU scaling function for viewing panoramic images. The bottom source curve is the mirror of the top source curve. The source curves pass through the image corners and have a minimum (or maximum) at the center vertical scanline. One parameter specifies the height of the center points and a second parameter is the warping factor, α, as discussed above.

Figure 10A:
FIG. 10A illustrates a perspective view of a ball room without any correction.
Figure 10B:
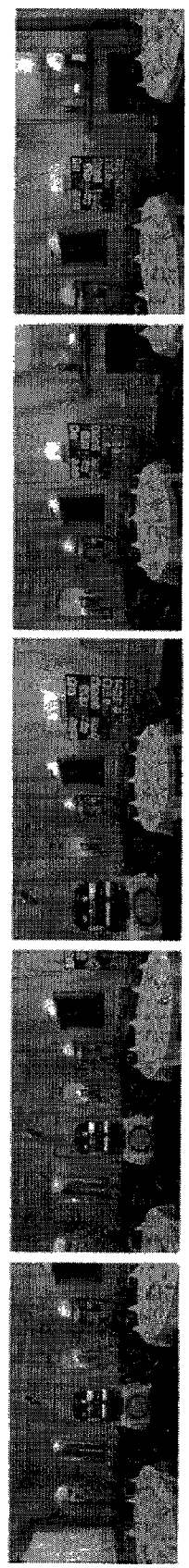
FIG. 10B illustrates the same view as FIG. 10A after applying the SVU scaling function.

In order to visually illustrate the effectiveness of the real-time wide-angle image correction system and method in removing swimming motions, FIGS. 10A and 10B are presented. Both FIGS. 10A and 10B illustrate a snap shot during a panorama viewing of a ball room with a perspective projection and a 100 degree field-of-view. FIG. 10A illustrates a perspective view of the ball room without any correction. FIG. 10B illustrates the same view as FIG. 10A after applying the SVU scaling function. From FIGS. 10A and 10B, it can be seen that the image is less distorted after processing using the SVU scaling function. More importantly, when the scene in FIG. 10A is rotated with a perspective projection serious stretching and swimming motions on the walls and tables are observed. After applying the SVU scaling function, very little stretching is observed and swimming motions are virtually eliminated. The result is that the scene looks much more stable while the scene is being rotated.

VI. Working Example and Results

The following working example is used to illustrate the operational details of the invention. This working example includes the implementation of the method of FIG. 4. It should be noted that this working example is only one way in which the invention may operate and be used, and is provided for illustrative purposes only.

In this working example, the system and method of the invention was implemented in a video conferencing environment. Video conferencing systems need to be able to display a wide set of views to allow remote viewers to see all the participants. Typically, these participants are seated around a table. Current systems use a tilt/pan/zoom camera to provide the possibility of viewing different portions of the room. However, these current systems cannot provide a complete overview. They also suffer from latency when panning to cover a new speaker. In order to alleviate these problems, the real-time wide-angle image correction system and method of the invention were used.

Figure 11:
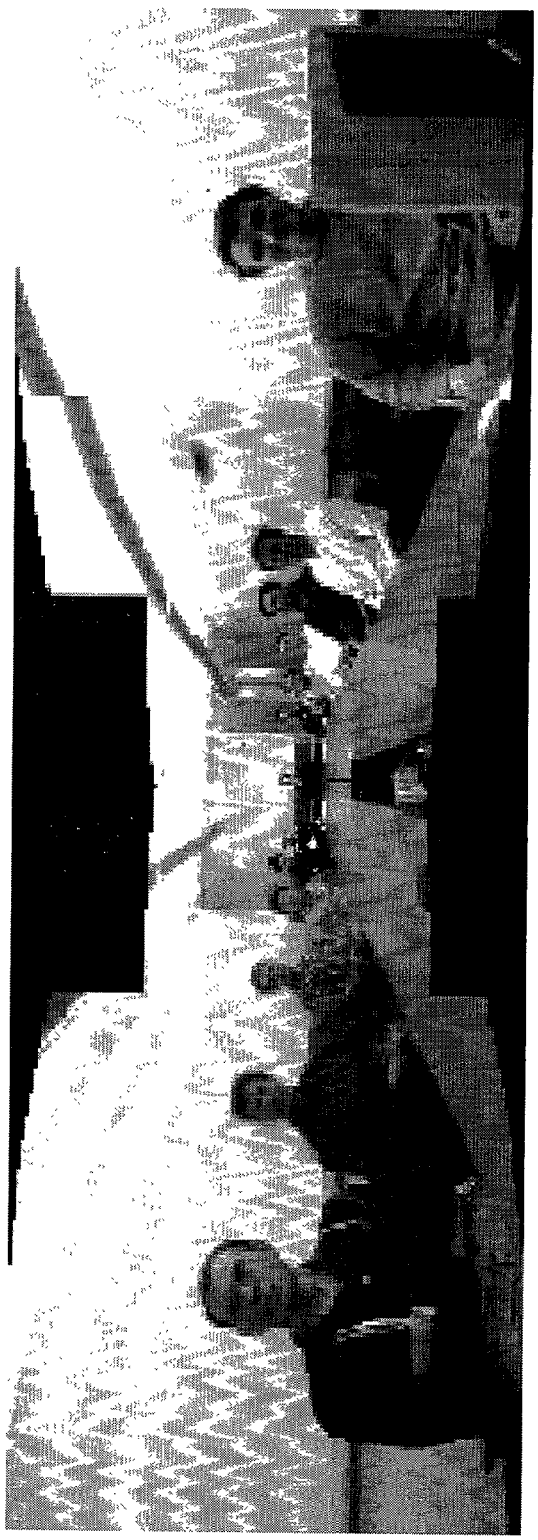
FIG. 11 illustrates the resulting cylindrical wide-angle image generated from the wide-angle camera of the working example.

A wide-angle image having a cylindrical projection was obtained using a wide-angle camera directed at the scene of the video conferencing. FIG. 11 illustrates the resulting cylindrical wide-angle image generated from the wide-angle camera. In FIG. 11, note that the person at the far end of the table is extremely small. While the geometric distortions around the edges are corrected by a cylindrical projection, there is little improvement in terms of depth min-perception. People at the far end of the table still looks very small compared to the people near the camera.

Figure 12:
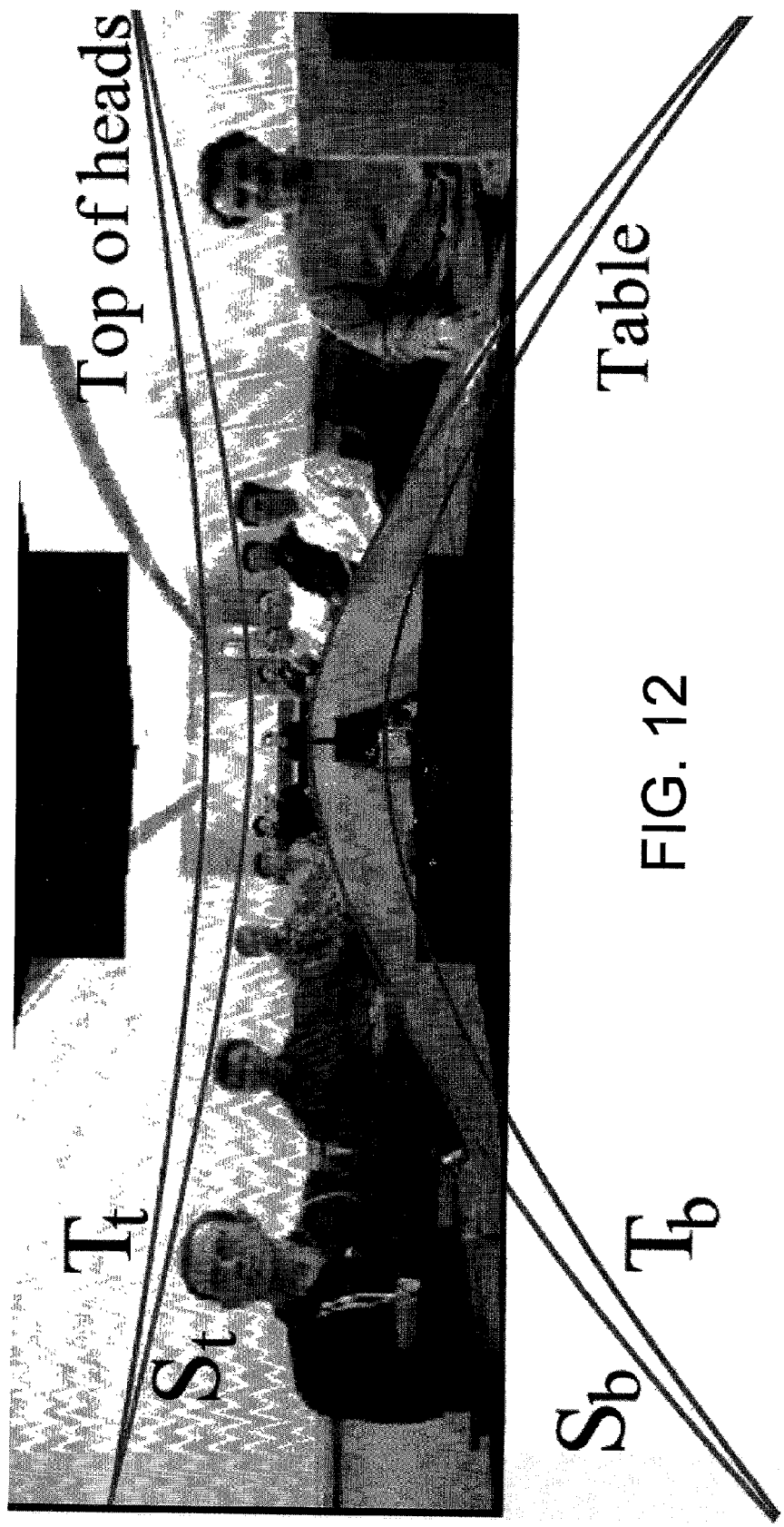
FIG. 12 illustrates both the source and target curves with the warping factor, $\alpha=0.3$.
Figure 13:
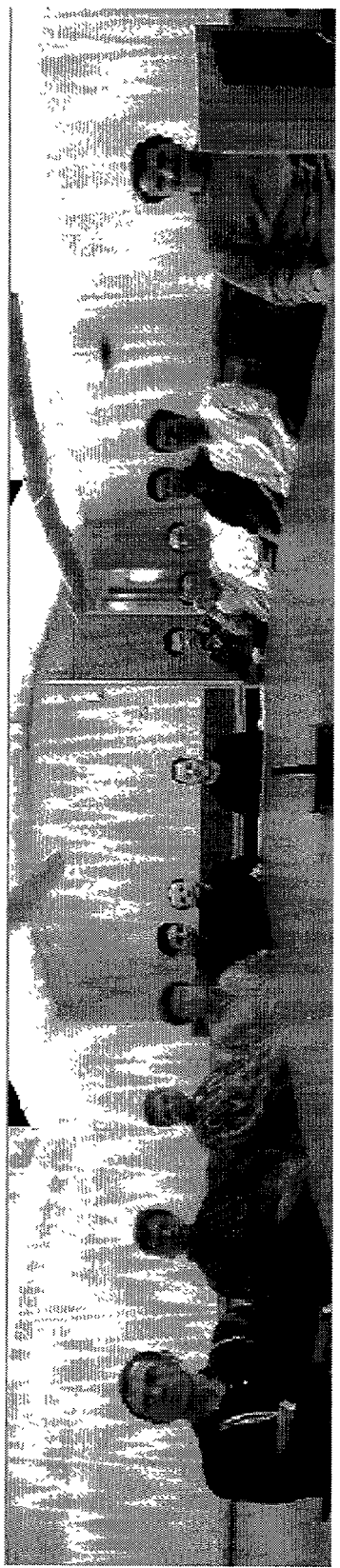
FIG. 13 illustrates the preliminary corrected image of the working example, which is a result of applying SVU scaling warping functions without horizontal distortion correction.
Figure 14:
FIG. 14 illustrates the result of applying the SVU scaling functions with horizontal distortion correction.

The results from the after processing of the image in FIG. 11 by the real-time wide-angle image correction system and method are shown in FIGS. 12–16. FIG. 12 illustrates both the source and target curves with the warping factor, α=0.3. FIG. 13 illustrates the preliminary corrected image that is a result of applying vertical and horizontal scaling using the SVU scaling functions without horizontal distortion correction. FIG. 14 illustrates the result of applying the SVU scaling functions with horizontal distortion correction.

Figure 15:
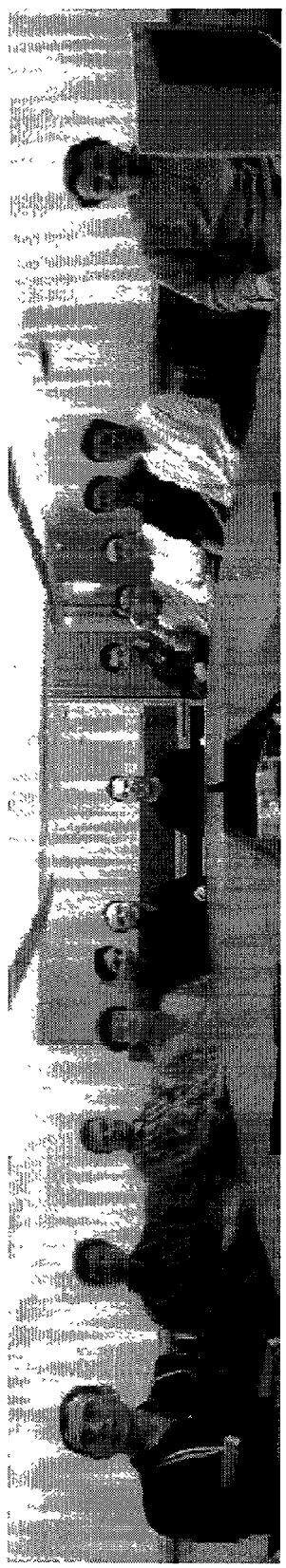
FIG. 15 illustrates the corrected wide-angle image of the working example using a warping factor, $\alpha=0.2$.
Figure 16:
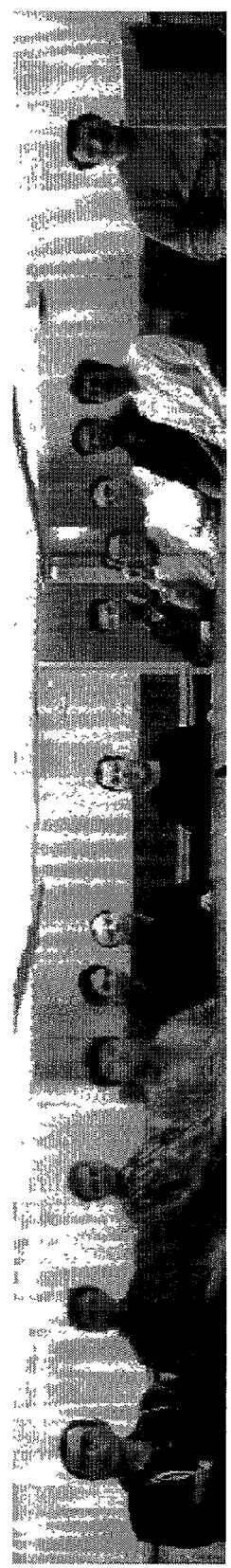
FIG. 16 illustrates the corrected wide-angle image of the working example using a warping factor, $\alpha=0.4$.

In addition, some results using different warping factors, α, are presented. Specifically, FIG. 15 illustrates the results with a warping factor, α=0.2. FIG. 16 illustrates the results with a warping factor, α=0.4. It should be noted that a warping factor of α=0 is a minimum warping while a warping factor of α=1 is a maximum warping.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

APPENDIX I

The following discussion is intended to provide more mathematical details about the causes of apparent distortions in wide-angle images.

Shape Distortion and Non-Rigidity Artifacts

Figure 17:
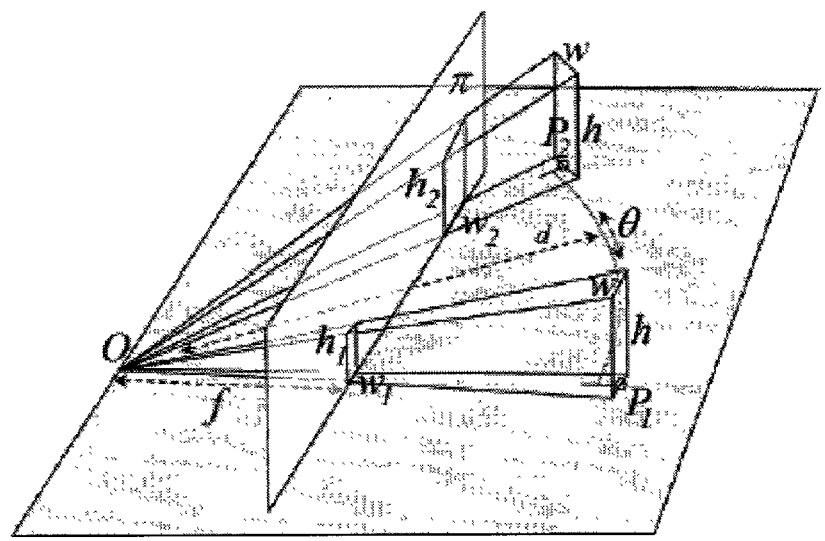
FIG. 17 illustrates a perspective projection of a rectangular object rotating around a camera.

As objects move from the center to the edges in a wide-angle image they appear to distort. FIG. 17 illustrates a perspective projection of a rectangular object rotating around the camera. O is the projection center, π is the projection plane, and f is the focal length. Let w and h be the width and the height of the object. Suppose that the object rotates from $P_1$ to $P_2$, where $OP_1$ is perpendicular to the image plan and θ is the angle between $OP_2$ and $OP_1$. Let d =||$OP_1$||=||$OP_2$||. At position $P_1$, its width and height on the image plane are:

$$w_1 = \frac{fw}{d} \quad (4)$$

$$h_1 = \frac{fh}{d} \quad (5)$$

At $P_2$, its width and height (the lengths of the two edges adjacent to $P_2$) on the image plane are:

$$w_2 = \frac{fw}{d \cdot \cos^2\theta} \quad (6)$$

$$h_2 = \frac{fh}{d \cdot \cos\theta} \quad (7)$$

This yields:

$$w_2 = \frac{1}{\cos^2\theta} \cdot w_1 \quad (8)$$

Equations (5) and (6) show that both the width and the height increases as the object rotates from the image center to the edge. The larger the field-of-view angle, the more the amount of increase. Equation 7 shows that the image of the object also deforms (stretches) when the object rotates from the image center to the edge. The larger the field-of-view angle, the more the amount of deformation. As the field-of-view approaches 90 degrees, the deformation ratio $w_2/h_2$ approaches infinity.

The perspective deformations are still correct in that if the viewer of the image places their eye at O, the image would not appear deformed. However, when viewing the wide-angle image with a smaller field-of-view the viewer expects smaller increases of image sizes as well as a smaller amount of deformation on the image plane as the object rotates. This is why objects appear stretched at the edges. The two angles that used to subtend equal angles now do not. The larger than expected changes in size and deformation on the image planee make the user feel that the scene is not rigid, as if it were swimming around the user.

Depth Misperception

Figure 18A:
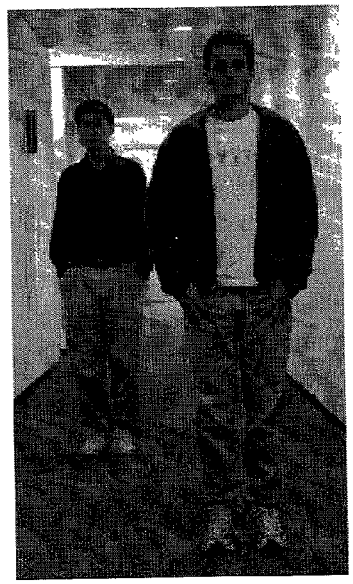
FIG. 18A illustrates the depth misperception concept and shows a scene captured with a regular field-of-view camera.
Figure 18B:
FIG. 18B shows the same scene as in FIG. 18A captured with a wide-angle camera.

A related problem caused by the smaller field-of-view at viewing time is the misperception of depth. Wide-angle images exaggerate the depth disparity between near and far objects. One important visual cue of the depth of an object in a scene is the ratio (called the depth foreshortening ratio) between the image sizes of similar objects placed at near and far locations. A smaller field-of-view results in a smaller foreshortening ratio. This is evident in two photographs taken of two people, one slightly further away from the camera than the other. FIGS. 18A and 18B illustrates the depth misperception concept. In FIG. 18A, a scene is captured with a regular field-of-view camera. In FIG. 18B, the same scene is captured with a wide-angle camera. As can be seen by comparing FIGS. 18A and 18B, the wide-angle camera (shown in FIG. 18B) exaggerates the difference between the sizes of the two people and thus the distance between the two people appears to increase in the picture taken with the wide-angle camera. In video conferencing applications, the wide-angle camera image results in the distant participants being extremely small in the scene.

APPENDIX II

Figure 19:
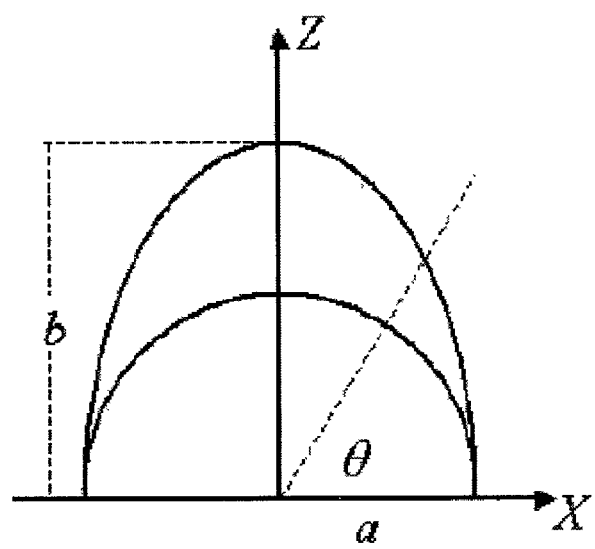
FIG. 19 illustrates a two-dimensional diagram of the cross sections of the regular cylinder and the elliptical cylinder.

The following discussion shows that a projection onto a generalized cylindrical surface does not produce locally uniform scaling. Consider the example of projecting a regular cylindrical view to an elliptic cylinder (the cross section is an ellipse). FIG. 19 illustrates a two-dimensional diagram of the cross sections of the regular cylinder and the elliptical cylinder. Denote a and b to be the short and long axes of the ellipse. Then the equation of the ellipse is x=a cos (θ) and z=b sin (θ). The equation of the circle is x=a cos (θ) and z=b sin (θ). Denote s' and s to be the arc lengths of the ellipse and the circle, respectively. Then, $$\frac{ds'}{d\theta} = \sqrt{\left(\frac{dx}{d\theta}\right)^2 + \left(\frac{dz}{d\theta}\right)^2} \quad (11)$$

$$= \sqrt{a^2\sin^2\theta + b^2\cos^2\theta} \quad (12)$$

$$\frac{ds}{d\theta} = a. \quad (13)$$

Given an infinitely small dθ, the arc lengths on the circle and the ellipse are ds and ds', respectively. Therefore, the local horizontal scaling is ds'1 ds=sqrt($a^2\sin^2\theta+b^2\cos^2\theta$)/a. When θ=π/2, the local horizontal scaling ds'1 ds=1 while the vertical scaling (y-axis) is b/a. Therefore, the vertical scaling is larger than the horizontal scaling and objects will appear stretched vertically. The exact opposite is true when θ=0. Its vertical scaling is 1 while its horizontal scaling is b/a. Therefore, objects close to θ=0 will appear stretched horizontally.

What is claimed is:

1. A method for performing real-time correction of a wide-angle image, comprising:
    obtaining pixel coordinates from the wide-angle image, hereinafter called wide-angle image pixel coordinates;
    generating a warp table by applying a parametric image warping function to the pixel coordinates; and
    warping the wide-angle image in real time using the warp table to create a corrected wide-angle image;
    wherein generating a warp table further comprises;
    vertically scaling the wide-angle image pixel coordinates using the parametric image warping function to create vertically-scaled wide-angle image pixel coordinates;
    horizontally scaling the vertically-scaled wide-angle image pixel coordinates using the parametric image warping function to create a preliminary warp table containing preliminary pixel coordinates; and performing horizontal distortion correction on the preliminary warp table using the parametric image warping function to create the warp table.

2. The method as set forth in claim 1, wherein vertically scaling each vertical scanline further comprises using a main scaling factor to scale the wide-angle image pixel coordinates in the vertical direction.

3. The method as set forth in claim 2, further comprising computing the main scaling factor using source curves and target curves.

4. The method as set forth in claim 3, further comprising:
specifying source curves;
specifying a warping factor; and
computing target curves using the source curves and the warping factor.

5. The method as set forth in claim 4, wherein the source curves further comprise a bottom source curve and a top source curve.

6. The method as set forth in claim 4, wherein the target curves further comprise a bottom target curve and a top target curve.

7. The method as set forth in claim 1, wherein horizontally scaling further comprises using a main scaling factor for each vertical scanline to scale the wide-angle image pixel coordinates in the horizontal direction.

8. The method as set forth in claim 7, wherein the main scaling factor is computed using source curves and target curves.

9. The method as set forth in claim 2, wherein horizontally scaling further comprises using the main scaling factor to horizontally scale the vertically-scaled wide-angle image pixel coordinates.

10. The method as set forth in claim 1, wherein performing horizontal distortion correction further comprises:
dividing the preliminary warp table into a plurality of sections; and
scaling preliminary pixel coordinates contained in each of the sections in the vertical direction using at least two different scaling factors.

11. The method as set forth in claim 10, wherein the at least two different scaling factors include a main scaling factor and a secondary scaling factor.

12. A method for correcting distortion of a wide-angle image captured by a wide-angle camera, comprising:
inputting wide-angle pixel coordinates corresponding to pixel coordinates of the wide-angle image;
defining source curves and target curves to determine Spatially Varying Uniform (SVU) scaling functions;
using the SVU scaling functions having scaling factors to generate a warp table containing the corrected wide-angle pixel coordinates; and
creating a corrected wide-angle image that is corrected for an exaggerated depth within the wide-angle image.

13. The method as set forth in claim 12, wherein the source curves are defined by a user.

14. The method as set forth in claim 12 further comprising having a user define a warping factor that specifies an amount of warp applied to the wide-angle image.

15. A computer-readable medium having computer-executable instructions for real-time correction and viewing of a wide-angle image, comprising:
generating a warp table containing coordinates of pixels within the wide-angle image, further comprising:
specifying source curves on the wide-angle image;
specifying a warping factor corresponding to an amount of warping applied to the wide-angle image pixel coordinates;
computing target curves using the source curves and the warping factor;
computing a main scaling factor using the source curves and the target curves;
using the main scaling factor to scale the wide-angle image pixel coordinates to generate the warp table; and
applying the warp table to the wide-angle image to create a corrected wide-angle image.

16. The computer-readable medium as set forth in claim 15, wherein using the main scaling factor further comprises:
vertically scaling each vertical scanline of the wide-angle image pixel coordinates using the main scaling factor; and
horizontally scaling the wide-angle image pixel coordinates using the main scaling factor.

17. The computer-readable medium as set forth in claim 15, wherein the warping factor is a number between 0 and 1, inclusive.

18. The computer-readable medium as set forth in claim 15, wherein the source curves include a top source curve and a bottom source curve, the top source curve defining a horizontal feature at a top of the wide-angle image and the bottom source curve defining a horizontal feature at a bottom of the wide-angle image.

19. A method for warping a wide-angle image, comprising:
vertically scaling pixel coordinates of each vertical scanline of the wide-angle image using a parametric image warping function and a main scaling factor;
horizontally scaling the pixel coordinates of the wide-angle image using the parametric image warping function and the main scaling factor;
generating a preliminary warp table containing preliminary pixel coordinates; and
correcting for horizontal distortion by applying the parametric image warping function and the main scaling factor to the preliminary warp table to generate a warp table.

20. The method as set forth in claim 19, further comprising:
applying the warp table to the wide-angle image to determine the location of the pixel coordinates of the wide-angle image in a corrected wide-angle image; and
applying a RGB value for each of the pixel coordinates of the wide-angle image to the corrected wide-angle image.

21. The method as set forth in claim 19, wherein the main scaling factor is computed using source curves specified by a user and target curves computed from the source curves.

22. The method as set forth in claim 19, wherein correcting for horizontal distortion further comprises applying a secondary scaling factor.

23. A method for correcting distortion and perception problems in a wide-angle image, comprising:
using Spatially Varying Uniform (SVU) scaling functions and a main scaling factor to vertically and horizontally scale pixel coordinates of the wide-angle image to produce a preliminary warp table containing preliminary pixel coordinates;

dividing the preliminary warp table into a plurality of sections, each section containing at least some of the preliminary pixel coordinates;

specifying a secondary scaling factor that is different from the main scaling factor; and vertically scaling each of the plurality of sections using the main scaling factor for preliminary pixel coordinates in a first set of sections of the plurality of sections and the secondary scaling factor for preliminary pixel coordinates in a second set of sections of the plurality of sections to correct for horizontal distortion.

24. The method as set forth in claim 23, further comprising computing the main scaling factor using a bottom source curve, a top source curve, a bottom target curve and a top target curve.

25. The method as set forth in claim 24, wherein the bottom source curve, the top source curve, the bottom target curve and the top target curve are cubic curves.

26. The method as set forth in claim 24, wherein dividing further comprises creating a first section that contains preliminary pixel coordinates corresponding to pixels in the wide-angle image located between the top source curve and the bottom source curve.

27. The method as set forth in claim 26, wherein the first set of sections is the first section, and wherein vertically scaling further comprises using the main scaling factor to scale the first section in the vertical direction.

28. The method as set forth in claim 27, wherein the second set of sections includes each of the plurality of sections except the first section, and wherein vertically scaling further comprises using the secondary scaling factor to scale the second set of sections in the vertical direction.

29. The method as set forth in claim 23, further comprising using a smoothing function to connect each of the plurality of sections.

30. The method as set forth in claim 23, further comprising performing horizontal distortion correction on the preliminary warp table to generate a warp table.

31. The method as set forth in claim 30, further comprising using the warp table to create a corrected wide-angle image from the wide-angle image.

32. A real-time wide-angle image correction system for correcting distortion and perception defects in a wide-angle image, comprising;

a warp table specifying a location within the wide-angle image of each pixel therein;

a warp table generation module that uses parametric image warping functions;

a warp table generated from the warp table generation module that contains the wide-angle image pixel coordinates; and a real-time image warping system that applies the warp table to the wide-angle image to create a corrected wide-angle image;

wherein the warp table generation module further comprises a main scaling factor for performing vertical and horizontal scaling.

33. The real-time wide-angle image correction system as set forth in claim 32, further comprising source curves and target curves used to compute the main scaling factor.

34. The real-time wide-angle image correction system as set forth in claim 32, wherein the warp table generation module further comprises:

a main scaling factor for performing vertical scaling and horizontal scaling; and a secondary scaling factor for performing horizontal distortion correction.

35. The real-time wide-angle image correction system as set forth in claim 32, wherein the warp table generation module further comprises:

an input module that receives the wide-angle image pixel coordinates;

a vertical scaling module that uses the parametric image warping functions to scale the wide-angle image pixel coordinates in a vertical direction;

a horizontal scaling module that uses the parametric image warping functions to scale the wide-angle image pixel coordinates in a horizontal direction to generate a preliminary warp table.

36. The real-time wide-angle image correction system as set forth in claim 35, further comprising a horizontal distortion correction module that vertically scales preliminary pixel coordinates in the preliminary warp table by different amounts depending on location.

* * * * *